United States Patent
Ales et al.

(10) Patent No.: US 11,915,476 B2
(45) Date of Patent: Feb. 27, 2024

(54) ONBOARD AI-BASED CLOUD DETECTION SYSTEM FOR ENHANCED SATELLITE AUTONOMY USING PUS

(71) Applicant: Airbus Defence and Space GmbH, Taufkirchen (DE)

(72) Inventors: Filippo Ales, Taufkirchen (DE); Michael Fritz, Taufkirchen (DE); Alisa Krstova, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 17/709,505

(22) Filed: Mar. 31, 2022

(65) Prior Publication Data
US 2022/0366684 A1 Nov. 17, 2022

(30) Foreign Application Priority Data
May 11, 2021 (EP) .................................... 21173352

(51) Int. Cl.
*H04L 67/12* (2022.01)
*G06V 20/13* (2022.01)
*G06V 10/70* (2022.01)

(52) U.S. Cl.
CPC .............. *G06V 20/13* (2022.01); *G06V 10/70* (2022.01); *H04L 67/12* (2013.01)

(58) Field of Classification Search
CPC ........ G06V 20/10; G06V 20/13; G06V 20/17; G06V 10/70; H04L 67/12; H04L 67/125
USPC ............................................... 348/144
See application file for complete search history.

(56) References Cited

U.S. PATENT DOCUMENTS

| | | | | |
|---|---|---|---|---|
| 5,995,681 A | * | 11/1999 | Lee | G01C 11/02 356/139.08 |
| 9,643,722 B1 | * | 5/2017 | Myslinski | G06V 20/40 |
| 2005/0071054 A1 | * | 3/2005 | Weiner | B64G 1/10 701/13 |
| 2017/0250751 A1 | * | 8/2017 | Kargieman | G06V 20/13 |
| 2021/0375142 A1 | * | 12/2021 | Mueller | G08G 5/0052 |

OTHER PUBLICATIONS

Extended European Search Report for EP Application No. 21173352.2, European Patent Office, dated Nov. 4, 2021.
J. Steffen et al: "Utilizing Artificial Intelligence to achieve a robust architecture for future robotic spacecraft", 2015 IEEE Aerospace Conference, IEEE, pp. 1-14, XP032782759, Mar. 7, 2015.

(Continued)

*Primary Examiner* — Bharat Barot
(74) *Attorney, Agent, or Firm* — Williams Mullen; Thomas P. Bergert

(57) ABSTRACT

An onboard cloud detection system comprising: a camera (1000) configured to acquire images of the Earth at predetermined acquisition intervals; and a data processing unit (2000) comprising: a cloud detection unit (2210) configured to use artificial intelligence, AI, algorithms to detect clouds; a packet utilization standard, PUS, application layer (2230) configured to issue telemetry and/or telecommands corresponding to a predetermined parameter of the output of the cloud detection unit (2210); and an interface configured to distribute the telemetry and/or telecommands to an external hardware and/or an external software terminal (3000, 4000).

13 Claims, 4 Drawing Sheets

(56) References Cited

OTHER PUBLICATIONS

M. Esposito et al: "Highly Integration of Hyperspectral, Thermal and Artificial Intelligence for the ESA PHISAT-1 Mission", Proceedings of the 70th IAC (International Astronautical Congress), Washington DC, USA, Oct. 21-25, 2019.
European Cooperation For Space Standardization: ECSS-E-ST-70-41C—"Telemetry and Telecommand Packet Utilization"—Space Engineering, Apr. 15, 2016.
European Patent Office, Examination Report for International Patent Application No. 21 173 352.2, dated Apr. 24, 2023.
Furano et al: "AI in space: applications examples and challenges", 2020 IEEE International Symposium on Defect and Fault Tolerance in VLSI and Nanotechnology Systems (DFT), IEEE, pp. 1-6, Oct. 19, 2020.

* cited by examiner

ONBOARD AI-BASED CLOUD DETECTION SYSTEM FOR ENHANCED SATELLITE AUTONOMY USING PUS

CROSS REFERENCE TO RELATED APPLICATIONS

The present application claims the benefit under 35 U.S.C. 119 of European Patent Application No. 21173352.2 filed on May 11, 2021.

FIELD OF THE INVENTION

The present invention relates to an onboard cloud detection system and a corresponding method relating to the cloud detection system. The onboard cloud detection system comprises a camera and a data processing unit used to process the images acquired by the camera.

BACKGROUND TO THE INVENTION

An on-board mechanism to detect clouds has been successfully tested in flight. The ESA satellite Phi-Sat-1 uses a Data Processing Unit (DPU) for evaluating if the images acquired with the Phi-Sat-1 payload camera are covered by clouds or not. Based on the cloud coverage, the data can be either stored on-board, or is directly discarded. However, this approach is based on a solution tailored for a simple payload instrument as the one of Phi-Sat-1.

For a complex space program, such an implementation requires a particular design solution and hardware implementation which might not be compatible with the current space grade hardware standards, and might induce higher costs due to necessary customization. In addition, the payload is always operational and consuming full power, thus potentially reducing the mission lifetime and the available on-board resources. Furthermore, this architecture requires that either each instrument has its own dedicated AI image processing unit or that the centralized DPU processes multiple data streams in parallel. Since the data content will be different, multiple AI algorithms will need to run in parallel on the hardware, increasing its complexity.

There is therefore a need for a simple onboard cloud detection system which optimizes onboard memory space and reduces power consumption.

SUMMARY OF THE INVENTION

The invention is set out in the independent claims. Preferred embodiments of the invention are set out in the dependent claims.

The invention described below describes a dedicated on-board cloud detection chain which can be applied to control any payload equipment, and also to multiple equipment simultaneously. This invention applies the packet utilization standard (PUS) which is already deployed as baseline on most satellites. In addition, a dedicated chain allows keeping the payload equipment (or a part of its chain) in standby when the cloud coverage is too high, thus reducing the consumed power. By an analysis of the expected overall cloud coverage in the mission orbit, this approach may allow for optimization of satellite resources like solar array and/or battery sizes/lifetime and/or any other equipment.

The PUS-based system described in the present application can be realized as part of a dedicated on-board processing chain, independent from the payload. This approach may allow for satellite payload equipment to be controlled based on cloud detection. Indeed, if the cloud detection system is included as a secondary payload of opportunity, no changes on the primary equipment hardware (or any tailoring to the hardware) may be necessary. This may maximize re-use thereby reducing any non-recurring costs or schedule risk on the main payload side. Therefore, if there are a high number of elements of the Payload Data Handling and Transmission (PDHT) chain that rely on low cloud coverage for achieving their mission objective, there may be great benefits to using the described system.

In addition, on-board memory and ground contact times, but also total payload power consumption may be reduced according to the expected cloud coverage in the mission orbit. Less on-board memory and less power-consumption (i.e. smaller memory, batteries and solar arrays) may allow for a reduction in volume, mass and cost of the satellite. Less ground contact time may also reduce the operation cost of the satellite.

Furthermore, models based on deep neural networks can have up to several million parameters, leading to a large model size (up to several gigabytes). The on-board storage and execution of such models are infeasible due to the hardware limitations on satellites; therefore, after achieving satisfactory model performance, the model may be compressed into a representation with a low computational and storage footprint configured to store and run it on one of the on-board processing units described further below.

It is thusly expected that this invention may allow for a notable reduction in the overall cost of manufacturing and operating Earth observation satellites.

Furthermore, the configurable thresholds may allow for optimization of the approach for individual mission orbits and instrument characteristics.

According to a first aspect, we describe an onboard cloud detection system. The system comprises a camera configured to acquire images of the Earth at predetermined acquisition intervals. The system further comprises a data processing unit (DPU). The DPU comprises a cloud detection unit configured to use artificial intelligence algorithms to detect clouds. The DPU further comprises a packet utilization standard application layer configured to issue telemetry and/or telecommands corresponding to a predetermined parameter of the output of the cloud detection unit. The DPU further comprises an interface configured to distribute the telemetry and/or telecommands to an external hardware and/or an external software terminal.

The camera allows for images of the Earth to be acquired. The camera is however not limited to acquiring images of the Earth but may additionally or alternatively acquire images of any celestial body. The camera may be or comprise a visible light camera, an infrared camera and/or any other suitable type of camera.

The cloud detection unit is configured to use artificial intelligence algorithms (AI) to detect clouds within the acquired images. This may allow for a particularly accurate method of measuring cloud coverage within an acquired image. The AI algorithms are explained in detail below.

The packet utilization standard (PUS) application layer is configured to issue telemetry and/or telecommands corresponding to a predetermined parameter of the output of the cloud detection unit. The telemetry and/or telecommands are issued according to a communication standard preferably based upon a PUS standard, in particular, ECSS-E-70-41. This may allow for the system to be incorporated into any known spacecraft and allow for the outputs of the system to be easily received by any conventional type of receiver.

The interface is configured to distribute the telemetry and/or telecommands to an external hardware and/or an external software terminal. This may allow for the outputs of the system to be easily transferred to a terminal which can report the outputs back to Earth and/or an external transceiver.

In some examples, the telemetry and/or telecommands are configured to enable and/or disable the main payload either directly or, wherein the on-board computer is configured to enable and/or disable the main payload, via such on-board computer. Which of these two options is selected depends on the on-board system architecture (for example, availability of instrument control unit or not) and the actual concept of operations (for example, event based control or mission timeline control of the payload). In each case, the enabling and/or disabling of the main payload is configured to be triggered according to the predetermined parameter of the output of the cloud detection unit. In one scenario, the main payload is enabled and/or disabled via the telemetry and/or telecommands without an intermediate component. In a second scenario, the main payload is enabled and/or disabled via the on-board computer. In some examples, the telemetry and/or telecommands are routed via the on-board computer. These scenarios may allow for the main payload to be enabled and/or disabled according to the predetermined parameter of the output of the cloud detection unit. This in turn may result in a reduced power usage of the system as the main payload is not constantly acquiring data. Furthermore, this may allow for the memory space to be reduced as the number of data acquired by the main payload are fewer. The main payload may comprise instruments and/or experiments which work best with low cloud coverage. The main payload may comprise optical and/or infrared cameras, communication terminals, in particular optical communication terminals (e.g. laser communication terminals), radar instruments or any other suitable instrument and/or experiment. The main payloads may be defined as the instruments and/or experiments which are not part of the cloud detection chain.

In some examples, the AI algorithms are configured to be based upon deep learning and/or machine learning. This may allow for the cloud detection to be particularly accurate thereby leading to a more accurate system.

In some examples, the system further comprises a threshold detection unit configured to detect if the predetermined parameter is above or below a predefined threshold. This threshold detection unit may determine if the parameter is at an acceptable level. The method of threshold detection will be described in more detail below.

In some examples, the predetermined parameter is a percentage of one of the acquired images covered by clouds. This may allow for the PUS application layer to enable and/or disable the main payload based on the cloud cover of the acquired images.

In some examples, the main payload is configured to be enabled and/or disabled if the percentage of the image covered by clouds is above or below the predetermined threshold. This may result in a reduced power usage of the system as the main payload is not constantly acquiring images. Additionally, this may allow for the memory space to be reduced as the number of images acquired by the main payload are fewer.

In some examples, the SW application layer is configured to count a number of consecutive inputs where the predetermined parameter is above or below the predefined threshold. This may allow for the threshold detection unit, and thereby the PUS application layer, to control the main payload. For example, if there are a number of images where the parameter is below the threshold and then a single image where the parameter is above the threshold, the threshold detection unit checks whether this is an anomaly or whether this is in the beginning of a string of images above the threshold. If the threshold detection unit waits for a string of images above/below the threshold, the threshold detection unit can be certain that the acquired images are above/below the threshold and therefore enable or disable the main payload accordingly.

In some examples, the predetermined acquisition intervals are controlled by a time scheduling service and/or an orbit position scheduling service. This may allow for power and memory usage to be reduced as the main payload may not be activated while the spacecraft is over a scene obscured by clouds. In some examples, the predetermined acquisition intervals are used to enable and/or disable the main payload.

According to a second aspect, we describe a method for operating an onboard cloud detection system. The method comprises acquiring images of the Earth at predetermined acquisition intervals by a camera. The method further comprises detecting clouds by artificial intelligence algorithms in a cloud detection unit. The method further comprises issuing telemetry and/or telecommands corresponding to a predetermined parameter of the output of the cloud detection unit by a packet utilization standard application layer. The method further comprises distributing the telemetry and/or telecommands to an external hardware and/or an external software terminal by an interface.

The camera allows for images of the Earth to be acquired. The camera is however not limited to acquiring images of the Earth but may additionally or alternatively acquire images of any celestial body. The camera may be or comprise a visible light camera, an infrared camera and/or any other suitable type of camera.

The cloud detection unit is configured to use artificial intelligence algorithms (AI) to detect clouds within the acquired images. This may allow for a particularly accurate method of measuring cloud cover within an acquired image. The AI algorithms are explained in detail below.

The packet utilization standard (PUS) application layer is configured to issue telemetry and/or telecommands corresponding to a predetermined parameter of the output of the cloud detection unit. The telemetry and/or telecommands are preferably based upon a PUS standard, in particular, ECSS-E-70-41. This may allow for the system to be incorporated into any known spacecraft and allow for the outputs of the system to be easily received by any conventional type of receiver.

The interface is configured to distribute the telemetry and/or telecommands to an external hardware and/or an external software terminal. This may allow for the outputs of the system to be easily transferred to a terminal which can report the outputs back to Earth.

In some examples, the method further comprises enabling and/or disabling the main payload directly or enabling and/or disabling the main payload via the on-board computer, wherein the enabling and/or disabling of the main payload is configured to be triggered according to the predetermined parameter of the output of the cloud detection unit. In one scenario, the main payload is enabled and/or disabled via, for example, the telemetry and/or telecommands without an intermediate component. In a second scenario, the main payload is enabled and/or disabled via the on-board computer. In some examples, the telemetry and/or telecommands go via the on-board computer. These scenarios may allow for the main payload to be disabled and/or enabled according to the predetermined parameter of the output of the cloud detection unit. This in turn may result in a reduced power usage of the system as the payload consumers are not always drawing power. Furthermore, this may allow for the memory space to be reduced as the amount of data acquired by the main payload are fewer.

In some examples, the AI algorithms are configured to be based upon deep learning and/or machine learning. This may allow for the cloud detection to be particularly accurate thereby leading to a more accurate system. In some examples, the method further comprises detecting if the predetermined parameter is above or below a predefined threshold by a threshold detection unit. This threshold detection unit may determine if the parameter is at an acceptable level. The method of threshold detection will be described in more detail below.

In some examples, the predetermined parameter is a percentage of one of the acquired images covered by clouds. This may allow for the PUS application layer to enable and/or disable the main payload based on the cloud cover of the acquired images.

In some examples, the enabling and/or disabling of the main payload occurs if the percentage of the image covered by clouds is above or below the predetermined threshold. This may result in a reduced power usage of the system as the main payload is not constantly acquiring data. Additionally, this may allow for the memory space to be reduced as the number of data acquired by the main payload are fewer.

In some examples, the predetermined acquisition intervals are controlled by a time scheduling service and/or an orbit position scheduling service. This may allow for power and memory usage to be reduced as the main payload may not be activated while the spacecraft is over a scene obscured by clouds. In some examples, the predetermined acquisition intervals are used to control the activation and/or the deactivation of the main payload.

According to a third aspect, we describe a satellite comprising the onboard cloud detection system.

It is clear to a person skilled in the art that the statements set forth herein may be implemented under use of hardware circuits, software means, or a combination thereof. The software means can be related to programmed microprocessors or a general computer, an ASIC (Application Specific Integrated Circuit) and/or DSPs (Digital Signal Processors). For example, the processing unit may be implemented at least partially as a computer, a logical circuit, an FPGA (Field Programmable Gate Array), a processor (for example, a microprocessor, microcontroller (pC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP.

It is further clear to the person skilled in the art that even if the herein-described details will be described in terms of a method, these details may also be implemented or realized in a suitable device, a computer processor or a memory connected to a processor, wherein the memory can be provided with one or more programs that perform the method, when executed by the processor. Therefore, methods like swapping and paging can be deployed.

Even if some of the aspects described above have been described in reference to the arrangement, these aspects may also apply to the method and vice versa.

BRIEF DESCRIPTION OF THE DRAWINGS

These and other aspects of the invention will now be further described, by way of example only, with reference to the accompanying figures, wherein like reference numerals refer to like parts, and in which.

DETAILED DESCRIPTION OF THE PREFERRED EMBODIMENTS

Figure 1:
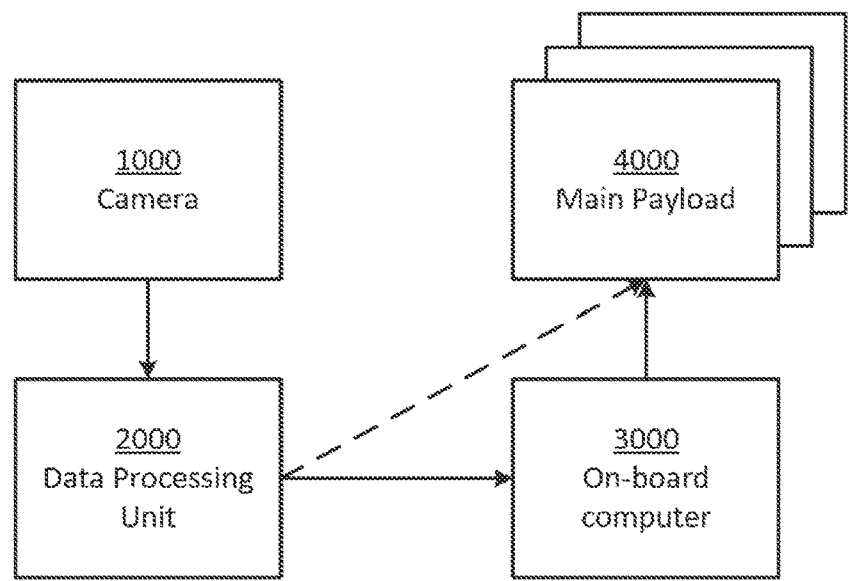
FIG. 1 shows a block diagram of the onboard cloud detection system according to an embodiment described herein.

FIG. 1 shows a block diagram of the onboard cloud detection system according to an embodiment described herein.

In a dedicated on-board processing chain, a camera 1000 is coupled to a Data Processing Unit (DPU) 2000. The camera 1000, which can operate in any suitable spectrum such as visible light, infrared or any other spectrum, may not be part of the main payload(s) 4000, but may be a dedicated unit used only to detect clouds. Alternatively, the camera 1000 is part of the main payload(s) 4000. The camera 1000 takes pictures in a configurable frequency and forwards every picture to the DPU 2000. The camera 1000 may be coupled to the DPU 2000 via wired and/or wireless means.

Figure 2:
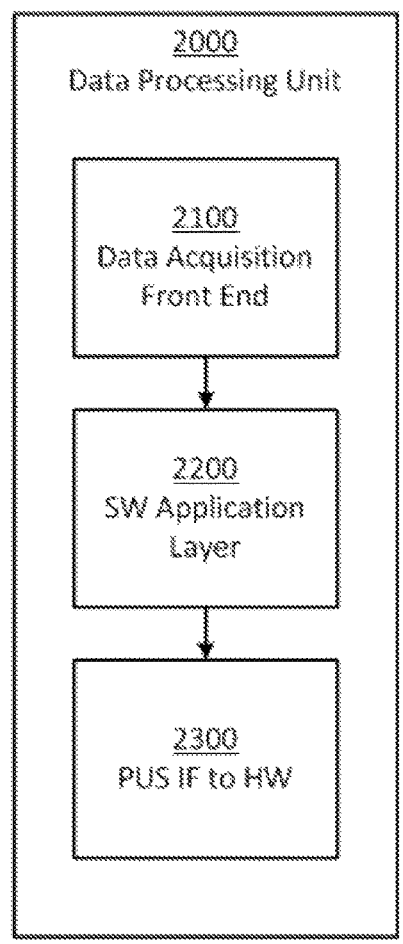
FIG. 2 shows a block diagram of the data processing unit according to an embodiment as described herein.

FIG. 2 shows a block diagram of the data processing unit according to an embodiment as described herein.

As shown in FIG. 2, the DPU 2000 comprises a Data Acquisition Frontend 2100 which may be the interface between the camera 1000 and the SW application layer 2200 where the image processing and commands/events are initiated. The packet utilization standard (PUS) commands/events may be directed towards the external equipment (i.e. a payload or an on board computer (OBC)) through the PUS IF to HW 2300.

Figure 3:
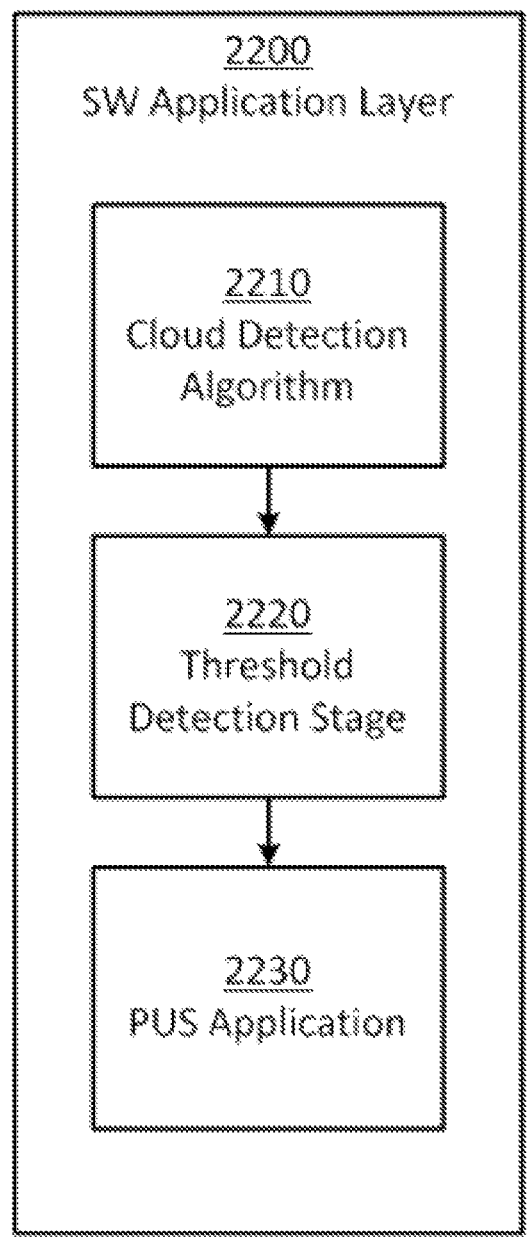
FIG. 3 shows a block diagram of the SW application layer according to an embodiment as described herein.

FIG. 3 shows a block diagram of the SW application layer according to an embodiment as described herein.

The SW Application Layer 2200 incorporates a Cloud Detection Algorithm (see FIG. 4) based on AI algorithms, a threshold detection stage 2220 and a PUS application layer 2300. The proposed system disclosed in this embodiment operates in the stages as follows:

i) Process the input image using the Cloud Detection Algorithm and determine the percentage of the area displayed in the image which is covered by clouds;

ii) Compare this percentage to a predefined threshold (above which an image is considered unusable) as part of the Threshold Detection Stage 2220; and iii) Based on the outcome of the threshold comparison, decide whether or not to execute a PUS-service command(s)—PUS Application 2230.

In this embodiment, the predefined threshold is a percentage of the image covered by clouds but alternatively, the threshold may be any suitable threshold. Alternatively, there may be multiple parameters, wherein each parameter is a suitable parameter. In this embodiment, the image is considered unusable if the percentage is above the threshold but alternatively, the image could be considered unusable if the percentage is below the threshold.

The above stages may operate simultaneously and/or in a different order from the order described.

In this embodiment, the PUS application layer 2230 is used to generate PUS packets, which conform to the ECSS-E-70-41 standard, which are afterwards routed to the PUS IF to HW 2300 for distribution to units connected downhill with respect to the DPU 2000 such as, for example, instrument control units and/or on-board computer and/or any other suitable unit. The PUS packets may additionally or alternatively conform to any other suitable standard.

The below describes a method of generating PUS packets according to this embodiment. The events preceded with "S" conform with the corresponding event in the ECSS-E-70-41 standard.

The method of generating PUS packets comprises:

i) Whenever the counter within the threshold detection stage is reset, a S5 event is generated. This event may coincide with a transition from clear sky to cloud covered sky or vice versa as will be described in more detail below.

ii) The S5 event is linked to an S19 event/action service. The reception of the "scene change", i.e. the transition, event initiates an action. Following actions are possible, but not limited to:

Activation of one or more On-board Control Procedures (OBCPs—S18) which activates/deactivates the payload equipment(s) data acquisition;

Activation of one or more On-Board Macro Procedures (OBMPs—S148) which activates/deactivates the payload equipment(s) data acquisition;

Activation/deactivation of a schedule ID/sub-schedule ID/group ID of the time based scheduling service (S11) or of the position based scheduling service (S22) for controlling scheduled data acquisitions;

The activation of a TC sequence (S21) for modifying the acquisition status of the payload equipment(s) through a sequence of telecommands; and Direct execution of telecommands at the level of the on-board computer or instrument control unit (via service 2 or private services).

Any other suitable actions may also be based on the "scene change" reception. The above actions may happen simultaneously and/or in a different order from those described above.

Based on the above-described embodiment, the instantiation of the PUS services within the PUS application layer includes Service 5 as mandatory service and Service 19 as optional service. In some embodiments, both Services are mandatory or both Services are optional. In some embodiments, other PUS Standard Services (like S148 or S21) or PUS private services may be instantiated to operate the main Payload(s).

Any services in a suitable PUS standard may be regarded as mandatory or optional depending on the actions taken and the order in which they are taken.

Figure 4:
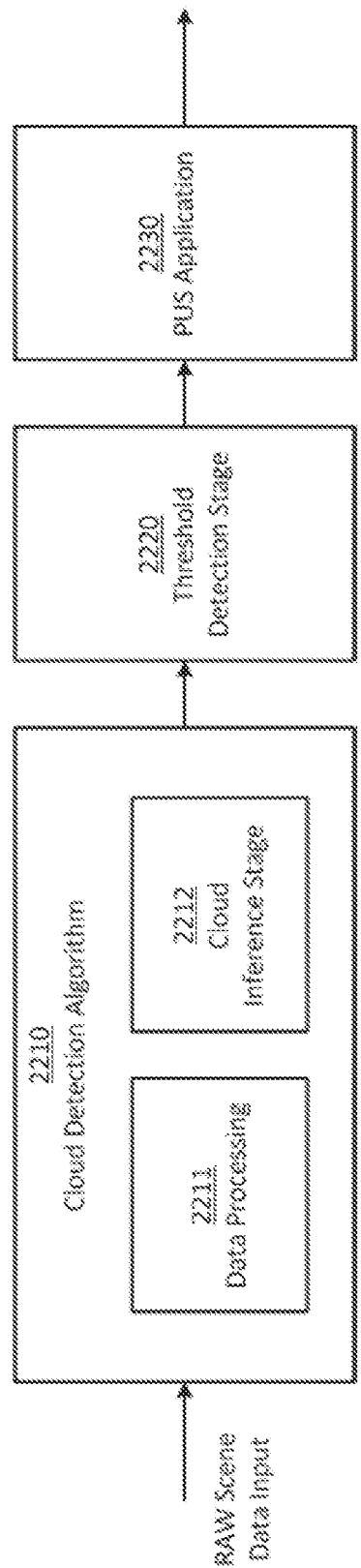
FIG. 4 shows a block diagram of a cloud detection algorithm and the SW application layer according to an embodiment as described herein.

FIG. 4 shows a block diagram of cloud detection algorithm and the SW application layer according to an embodiment as described herein.

The Cloud Detection Algorithm 2210 in this embodiment processes the image passed from the camera 1000 using a two-step approach:

i) Use methods from machine learning (ML) or deep learning (DL) to detect the presence of clouds and generate a cloud mask; and ii) Based on the cloud mask information, calculate the percentage of the total image area which is covered by clouds using standard image processing techniques.

The machine/deep learning component of the algorithm used in the first step of the process is trained on-ground, using satellite imagery data as a training dataset. This data can be publicly available satellite imagery data, airborne imagery data or a combination. The data may be any suitable data. The cloud mask information of the training set is provided either by manually labeling the pixels in an image or by executing an existing non-ML algorithm to generate the cloud masks. The resulting training dataset is representative in terms of:

i) Percentage of cloud cover—the images in the training set contain different percentages of cloud cover (for example, between 5% and 95% of the image area being covered by clouds) in order to ensure the algorithm's robustness against different weather conditions;

ii) Geographic regions—the images are sampled in a way to maximize the coverage of the Earth; and iii) Land cover types—as many land cover types as possible are included in the images (bare land, water, forest, snow, urban areas etc.).

In some embodiments, the training dataset is representative in only some of the above areas. Additionally or alternatively, the training dataset may comprise any suitable area.

The ML/DL component of the Cloud Detection Algorithm 2210 in this embodiment is based on publicly available (open-source) algorithm implementations. The development of the Cloud Detection Algorithm 2210 follows the standard ML/DL workflow:

i) Data preparation—this involves the collection, annotation, and separation into training/validation/test datasets of the satellite imagery data;

ii) Model selection—this phase takes advantage of publicly available algorithms for cloud detection, or more generally image processing, such as Convolutional Neural Networks (CNN). Using transfer learning to adapt pre-trained networks, e.g. U-Net and/or combining deep learning with a traditional image processing approach, is also considered; and iii) Iterative model training and refinement—this phase refers to the iterative process of model training, performance evaluation on the validation set, and tuning of the hyperparameters of the selected ML/DL algorithm. This process is repeated until the desired performance of the algorithm is achieved (for example, when the algorithm produces accurate cloud masks more than 90% of the time).

Complementary to the ML/DL model described above, the Cloud Detection Algorithm 2210 in this embodiment contains a mechanism to calculate the percentage of the area of the image covered by clouds. This step is executed by taking the cloud mask generated by the ML/DL model, finding the mask's boundaries in the image using cloud detection techniques like segmentation and calculating the cloud area (in pixels). This number is then compared to the overall number of pixels in the image to obtain the percentage of the total area covered by clouds.

The target platform for the execution of the Cloud Detection Algorithm 2210 comprises the following characteristics in this embodiment:

i) is scalable with respect to processing performance;
ii) has a simple software integration for the deployment of the algorithm;
iii) provides fault detection and containment capabilities; and
iv) provides PUS support.

In some embodiments, the Cloud Detection Algorithm 2210 may comprise any of the above-mentioned characteristics and/or any other suitable characteristic.

In this embodiment, the Cloud Detection Algorithm 2210 is trained by machine learning or deep learning. In some embodiments, the Cloud Detection Algorithm 2210 uses machine learning and deep learning. Additionally or alternatively, the cloud Detection Algorithm 2210 may be trained via any suitable method.

Figure 5:
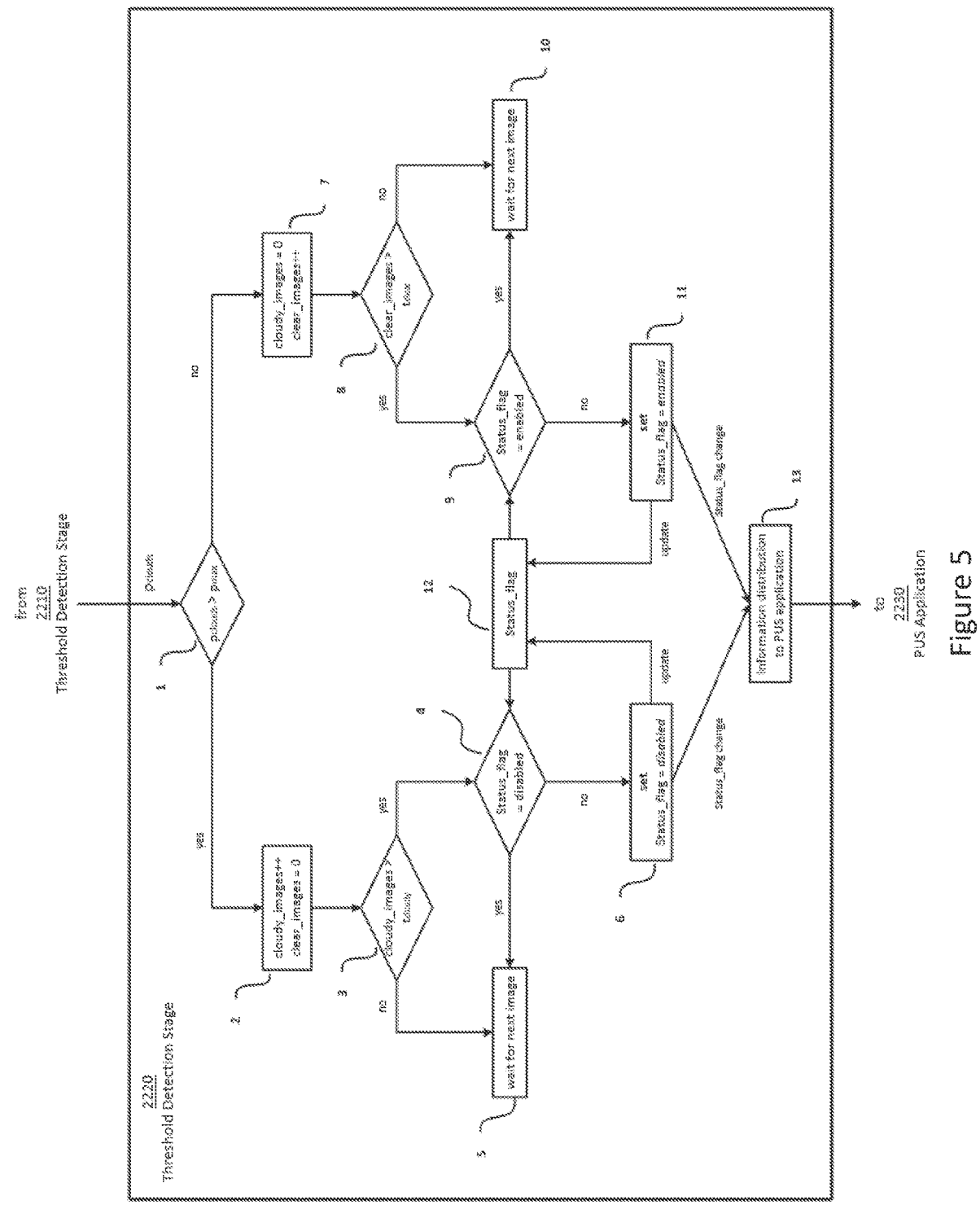
FIG. 5 shows a flowchart of the method for operating the cloud detection system according to an embodiment as described herein.

As described within the present application and as shown in FIG. 5 and its associated description below, the final output of the Cloud Detection Algorithm 2210 is a numerical value, $p_{clouds}$, describing the percentage of the total image area obstructed by clouds.

FIG. 5 shows a flowchart of the method for operating the cloud detection system according to an embodiment as described herein.

A simplified workflow describing the cloud detection and threshold detection is presented in FIG. 5. First, an image from the camera 1000 is passed to the Cloud Detection Algorithm 2210 as described above. The output of the algorithm is, in this embodiment, the percentage of the area of the input image which is covered by clouds, denoted by $p_{clouds}$. This percentage is compared to a predefined limit pmax, which specifies the maximum allowed percentage of cloud area in an image 1. In this embodiment, if the $p_{clouds}$ is above $p_{max}$, the image is considered to be unusable.

Two counters called cloudy_images and clear_images are used to "encode" the current state of the area under observation by the camera 1000.

In case of the image taken by the camera 1000 exceeding the percentage of acceptable cloud coverage, the cloudy_images counter is incremented by one and the clear_images counter is reset to zero 2. Additionally, if the cloud coverage is within the percentage which is set to be acceptable, the cloudy_images counter is reset to zero and the clear_images counter is incremented by one 7. In both cases, the picture is discarded afterwards, and no memory is required to store said image. If the cloudy_images counter exceeds a specified threshold, denoted by $t_{cloudy}$ 3, that means that the Cloud Detection Algorithm 2210 has detected a high percentage of clouds in several successive images and it is assumed that the quality of the images which would be acquired by the main payload 4000 will be low. If the Status_flag=disabled 4, it means that the main Payload(s) is already disabled and no further action is taken 5. If the Status_flag=enabled this is set to disabled in 12 through 6. Conversely, if the clear_images counter exceeds a specified threshold, denoted by $t_{clear}$ 8, that means that the current area of observation is unobstructed by clouds. If the Status_flag=enabled 9, it means that the main Payload(s) is already operational and no further action is taken 10. If the Status_flag=disabled this is set to disabled in 12 through 11.

After a decision on whether data acquisition should be enabled 11 or disabled 6 after $t_{cloudy}$ or $t_{clear}$ has been exceeded, an on-board PUS service management is used to control the payload equipments 13 directly (dashed line in FIG. 1) or through the On-board computer (for example, the main instrument or the mass memory unit is kept in idle mode instead of being switched to data acquisition mode). This can be triggered via a PUS service 5 event which in turn triggers service 19 event/action as described above in relation to FIG. 3.

The threshold $p_{max}$ may be adjustable based on the mission requirements of the onboard cloud detection system and the area which the camera 1000 is taking images of. The thresholds $t_{cloudy}$ and $t_{clear}$ may also be adjustable based on the mission requirements.

In this embodiment, the satellite comprises a processor and a memory in order to carry out the above method. In some embodiments, the processor and the memory are located in a processing unit. The processing unit may comprise any other component suitable for operating the method and/or the components of the satellite.

No doubt many other effective alternatives will occur to the skilled person. It will be understood that the invention is not limited to the described embodiments and en-compasses modifications apparent to those skilled in the art and lying within the scope of the claims appended hereto.

The invention claimed is:

1. An onboard cloud detection system comprising:
a camera configured to acquire images of the Earth at predetermined acquisition intervals; and
a data processing unit comprising:
a cloud detection unit configured to use artificial intelligence, AI, algorithms to detect clouds;
a packet utilization standard, PUS, application layer configured to issue telemetry and/or telecommands corresponding to a predetermined parameter of the output of the cloud detection unit, wherein the telemetry and/or telecommands are configured to enable and/or disable the main payload directly or via the on-board computer, wherein the enabling and/or disabling of the main payload is configured to be triggered according to the predetermined parameter; and
an interface configured to distribute the telemetry and/or telecommands to an external hardware and/or an external software terminal.

2. The onboard cloud detection system of claim 1, wherein the AI algorithms are configured to be based upon deep learning and/or machine learning.

3. The onboard cloud detection system of claim 1, further comprising a threshold detection unit configured to detect if the predetermined parameter is above or below a predefined threshold.

4. The onboard cloud detection system of claim 1, wherein the predetermined parameter is a percentage of one of the acquired images covered by clouds.

5. The onboard cloud detection system of claim 1, wherein the predetermined parameter is a percentage of one of the acquired images covered by clouds, and wherein the main payload is configured to be enabled and/or disabled if the percentage of the image covered by clouds is above or below the predetermined threshold.

6. The onboard cloud detection system of claim 2, wherein the SW application layer is configured to count a number of consecutive inputs where the predetermined parameter is above or below the predefined threshold.

7. The onboard cloud detection system of claim 1, wherein the predetermined acquisition intervals are controlled by a time scheduling service and/or an orbit position scheduling service.

8. A satellite comprising the onboard cloud detection system of claim 1.

9. A method for operating an onboard cloud detection system comprising:
acquiring images of the Earth at predetermined acquisition intervals by a camera;
detecting clouds, by artificial intelligence, AI, algorithms, in a cloud detection unit;

issuing telemetry and/or telecommands corresponding to a predetermined parameter of the output of the cloud detection unit by a packet utilization standard, PUS, application layer;

enabling and/or disabling the main payload directly or via the on-board computer, wherein the enabling and/or disabling of the main payload is configured to be triggered according to the predetermined parameter and distributing the telemetry and/or telecommands to an external hardware and/or an external software terminal by an interface.

10. The method of claim 9, further comprising detecting if the predetermined parameter is above or below a predefined threshold by a threshold detection unit.

11. The method of claim 9, wherein the predetermined parameter is a percentage of one of the acquired images covered by clouds.

12. The method of claim 9, wherein the predetermined parameter is a percentage of one of the acquired images covered by clouds, and wherein the enabling and/or disabling of the main payload occurs if the number of consecutive images covered by clouds is above or below the predetermined threshold.

13. The method of claim 9, wherein the predetermined acquisition intervals are controlled by a time scheduling service and/or a position scheduling service.

* * * * *